US012781941B2

(12) United States Patent
Kühl

(10) Patent No.: US 12,781,941 B2
(45) Date of Patent: Nov. 3, 2026

(54) COMPACT PHOTOMETRIC APPARATUS FOR RECONSTRUCTING A HOLOGRAM

(71) Applicant: Carl Zeiss Jena GmbH, Jena (DE)

(72) Inventor: Siemen Kühl, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 18/842,839

(22) PCT Filed: Feb. 24, 2023

(86) PCT No.: PCT/EP2023/054735

§ 371 (c)(1),
(2) Date: Aug. 30, 2024

(87) PCT Pub. No.: WO2023/165908

PCT Pub. Date: Sep. 7, 2023

(65) Prior Publication Data

US 2025/0180184 A1 Jun. 5, 2025

(30) Foreign Application Priority Data

Mar. 2, 2022 (DE) ........................ 102022104965.5

(51) Int. Cl.
*F21S 43/20* (2018.01)
*B60Q 1/32* (2006.01)
(Continued)

(52) U.S. Cl.
CPC ........ *F21S 43/26411* (2024.05); *B60Q 1/323* (2013.01); *F21S 43/235* (2018.01);
(Continued)

(58) Field of Classification Search
CPC .................. B60K 35/211; B60K 35/65; B60K 2360/29–794; B60Q 1/323–324;
(Continued)

(56) References Cited

U.S. PATENT DOCUMENTS 5,711,592 A 1/1998 Hotta
10,222,534 B2 * 3/2019 Masuda .............. G02B 6/0016
(Continued)

FOREIGN PATENT DOCUMENTS

DE 102012100209 A1 9/2012
DE 102018115574 A1 1/2020
DE 102021113410 A1 * 12/2022 ............... B60Q 3/64
JP H07192510 A 7/1995

OTHER PUBLICATIONS

International Search Report from related/corresponding International Patent Application No. PCT/EP23/54735, dated May 10, 2023.

(Continued)

*Primary Examiner* — Jason M Han
(74) *Attorney, Agent, or Firm* — Renner, Otto, Boisselle & Sklar, LLP

(57) ABSTRACT

The lighting device comprises an optical block having a coupling portion with a coupling face which is arranged to couple light into the optical block and a waveguide portion extending away from the coupling portion and designed to guide the light by multiple reflection between an upper face and a lower face of the waveguide portion. The optical block also comprises a holographical optical element that is formed in the waveguide portion and is designed to reconstruct a hologram by means of the light.

25 Claims, 6 Drawing Sheets

(51) Int. Cl.
*F21S 43/14* (2018.01)
*F21S 43/235* (2018.01)
*F21S 43/31* (2018.01)
*F21S 43/40* (2018.01)

(52) U.S. Cl.
CPC ............... *F21S 43/31* (2018.01); *F21S 43/40* (2018.01); *F21S 43/14* (2018.01)

(58) Field of Classification Search
CPC ......... B60Q 1/50–549; F21S 43/14–40; G02B 6/00–003; G03H 1/02–2202; G03H 2001/2226; G03H 2223/16
See application file for complete search history.

(56) References Cited

U.S. PATENT DOCUMENTS

| | | | | |
|---|---|---|---|---|
| 2014/0376207 | A1* | 12/2014 | Futterer | G02B 6/0035 359/3 |
| 2021/0318658 | A1 | 10/2021 | Shirakura | |

OTHER PUBLICATIONS

Search Report dated Nov. 2, 2022 from related/corresponding German Patent Application No. 102022104965.5.
Search Report (English translation) mailed Nov. 2, 2022 from corresponding Germany Patent Application No. 102022104965.5.
International Preliminary Report on Patentability and Written Opinion (English translation) from corresponding International Patent Application No. PCT/EP23/54735, dated Aug. 30, 2024.

* cited by examiner

COMPACT PHOTOMETRIC APPARATUS FOR RECONSTRUCTING A HOLOGRAM

RELATED APPLICATIONS

The present application is a National Phase patent application of PCT Appl. No. PCT/EP2023/054735, filed Feb. 24, 2023, which claims priority from German Patent Appl. No. DE102022104965.5, filed Mar. 2, 2023, each of which is hereby fully incorporated herein by reference.

FIELD OF THE INVENTION

Various examples of the disclosure relate to a lighting device that can be used to reconstruct a hologram.

BACKGROUND OF THE INVENTION

Holograms can be used in different fields of application. For example, holograms can be used to output signals.

SUMMARY OF THE INVENTION

There is a need for techniques that allow the particularly compact provision—i.e. in a small installation space—of lighting devices configured to reconstruct a hologram.

This object is achieved by the features of the independent claims. The dependent claims define embodiments.

A lighting device comprises a light source. The light source is configured to transmit light along a beam path. The lighting device also comprises an optical element. The optical element is arranged along the beam path and configured to reduce a divergence of the light. The lighting device also comprises an optical block. The optical block is arranged downstream of the optical element in the beam path, i.e. further away from the light source than the optical element. The optical block comprises a coupling portion with a coupling face, and a waveguide portion and a holographic optical element. The coupling face is arranged to couple the light into the optical block. The waveguide portion extends away from the coupling portion and is configured to guide the light by multiple reflections between a top side and a lower side of the waveguide portion. Moreover, the holographic optical element is formed in the waveguide portion and configured to reconstruct a hologram by means of the light.

The features set out above and features that are described hereinbelow may be used not only in the corresponding combinations explicitly set out, but also in further combinations or in isolation, without departing from the scope of protection of the present invention.

DETAILED DESCRIPTION OF THE INVENTION

Figure 1:
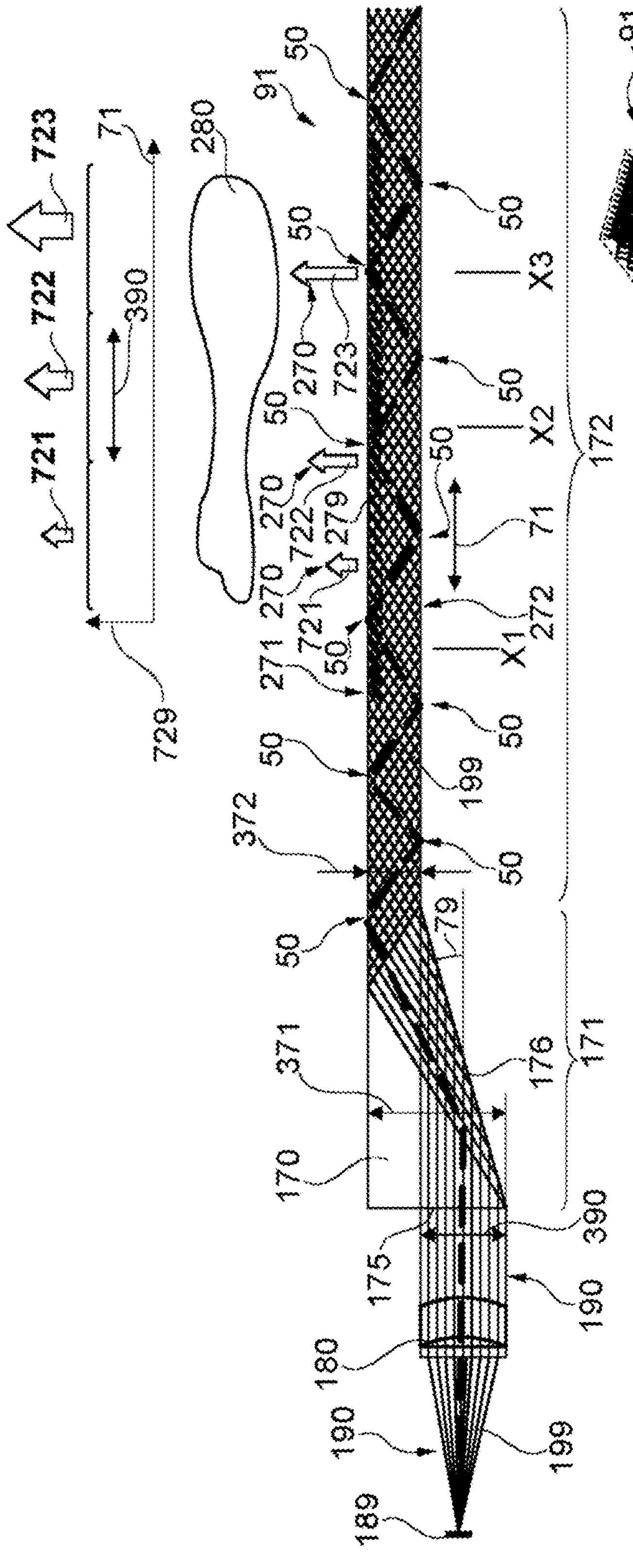
FIG. 1 is a schematic side view of a lighting device according to various examples.

Techniques which make it possible to reconstruct a hologram are described hereinbelow. For example, the hologram can reproduce a pictorial motif, for instance an information sign, a warning sign, an inscription or an image. For example, a floating hologram appearing to an observer as standing freely in space could be reconstructed.

The hologram is reconstructed by means of a holographic optical element produced previously during an exposure process.

The description relates to lighting devices in particular, which can be used to reconstruct a hologram. These lighting devices can be housed in a particularly compact installation space.

In various examples, the lighting devices use an optical waveguide which guides light for illuminating a holographic optical element in order thus to reconstruct the hologram.

The holographic optical element (also referred to as an HOE) may have variations in the refractive index of the corresponding carrier material such that the hologram is reconstructed by interference. The variation of the refractive index leads to light refracting with a diffraction pattern, whereby the hologram is reconstructed.

For example, the holographic optical element could be implemented as a volume HOE, i.e. a variation in the refractive index can have a three-dimensional extent. Thus, a corresponding refractive index-modulated region has a three-dimensional extent.

A surface HOE could also be used in some examples; in that case, a modulation of the surface of a substrate brings about the diffraction pattern. For example, the surface could be wavy.

The holographic optical element is embodied as a transmission HOE in various examples. This means that the refractive index-modulated region is illuminated from one side and the hologram is reconstructed in a region or volume facing the opposite side. However, reflection HOEs could also be used.

In particular, it is possible that the optical waveguide extends below the holographic optical element, or—in other words—that the holographic optical element is arranged on a corresponding outer side—for example the top side—of the waveguide.

As a general rule, the top side and opposite underside can be defined as desired (and could accordingly also be referred to as first side or second side).

Thus, light can be decoupled from the optical waveguide as a result of the holographic optical element and used for the reconstruction of the hologram.

According to various examples, a lighting device comprises an optical block. The optical block can be shaped from e.g. a transparent plastic or glass.

This optical block comprises a coupling portion and a waveguide portion. The coupling portion comprises a coupling face, through which light is coupled into the optical block. The light then runs from the coupling portion into the waveguide portion, where the light is guided by multiple reflections between the top side and underside opposite the top side.

The waveguide portion can thus act as waveguide and guide the light, for example by means of total-internal reflection in the optically dense medium.

As a result of the multiple reflections of light in the waveguide, it is possible to illuminate the holographic optical element over an extent significantly larger than the beam cross section of the beam path of the light. A plurality of "footprints" of the light beam path are successively created on the top side of the waveguide by reflection, e.g. so that the most homogeneous illumination possible is created for the holographic optical element.

As a result of the coupling portion it is possible to efficiently couple the light into the waveguide portion or optical block. The optical losses can be low, and so the lighting device has high optical efficiency.

Different strategies for forming the coupling portion, in particular, are described below.

FIG. 1 illustrates an exemplary lighting device 91. It comprises a light source 189 configured to transmit light 190 along a beam path 199. For example, the light source 189 can be implemented by one or more light-emitting diodes emitting light in the visible spectrum.

An optical element 180—embodied here as converging lens (with other implementations of the optical element 180 being conceivable, for example a concavely arched mirror)—is arranged in the beam path and configured to reduce the divergence of the light 190. Light 190 can be collimated well in the example of FIG. 1.

Then, an optical block 170 follows along the beam path 199. The optical block 170 comprises a coupling portion 171, through which light 190 initially passes. In particular, the coupling portion 171 comprises a coupling face 175 arranged to couple light 190 into the optical block 170. In the process, the coupling face 175 is oriented at right angles to the central ray of the beam path 199 of the light. As a result, coupling losses on account of the ideal Fresnel conditions are minimized.

This is subsequently adjoined by a waveguide portion 172 of the optical block 170 and said waveguide portion 172 extends away from the coupling portion 171 in a longitudinal direction 71 and is configured to guide the light 190 by multiple reflections 50 (e.g. total-internal reflection) between a top side 271 and an underside 272 of the waveguide portion 172.

A holographic optical element 279 is formed on the top side of the waveguide portion 172 and configured to reconstruct a hologram 280 by means of the light 190. A 3-D hologram is reconstructed above the surface 271 in the example of FIG. 1. The arrangement of the holographic optical element 279 in the example of FIG. 1 is only one variant. For example, it would be conceivable that, as an alternative to that or in addition, the holographic optical element 279 is formed on the underside of the waveguide portion 172. For example, if use is made of a two-part holographic optical element formed on both the top side 271 and the underside 272, then this could for example allow the foreground and the background of a three-dimensional hologram to be reconstructed separately, whereby a depth impression can be amplified.

For example, the holographic optical element 279 could be embodied as a transmission HOE in the example of FIG. 1. However, it would also be conceivable that the holographic optical element 279 is embodied as a reflection HOE in the example of FIG. 1. In this example, the light guided by the waveguide portion 172 would be incident on the holographic optical element 279 as a reflection HOE, would pass into the hologram material and initially through the latter without diffraction, would be subject to total internal reflection at the interface of hologram material and air, and would be diffracted efficiently on the return path. The non-diffracted zeroth order then propagates into the waveguide again.

From FIG. 1, it is evident that the thickness 371 of the optical block 170 in the region of the coupling portion 171 is greater than the thickness 372 of the optical block 170 in the region of the waveguide portion 172.

This embodiment of the coupling portion 171 allows the beam path 199 to be coupled into the optical block 170 with a particularly large beam cross section 390. In particular, the beam cross section 390 is greater than the thickness 372 in the example of FIG. 1. In general, the beam across section 390 at the coupling face 175 could be in a range of 100% to 500% of the thickness 372. As a result, the projection of the beam cross section 390 on the top side 271 of the waveguide portion 172 of the optical block 170 becomes comparatively large, and so a particularly homogeneous illumination for the holographic optical element 279 is made possible. Hence, the hologram 280 can be constructed with a high quality.

In the example of FIG. 1, the coupling portion 171 also comprises a reflection face 176 arranged opposite the coupling face 175 and configured to deflect the beam path 199 of the light 190 toward the waveguide portion 172 in the optical block 170. For example, this can be implemented by total-internal reflection or a reflective coating.

This enables a particularly compact structure of the lighting device 91 because the light source 189 and the optical element 180 can be arranged offset in relation to the optical block 170 in the longitudinal direction 71 of the waveguide portion 172. In particular, the maximum depth extent (thickness) of the lighting device 91 can thus correspond to the thickness 371. This also enables particularly installation space-restricted applications.

The light source is arranged such that the light 190 reaches the optical block 170 without deflection of the beam path 199. This allows quite a compact arrangement. Optical losses are minimized.

The angle of incidence of the light 190 on the holographic optical element 279 is determined by the arrangement of the reflection face 176 in relation to the beam path 199 (in particular by the angle 79). In this case, this angle of incidence corresponds to a reconstruction angle that is used to reconstruct the hologram 280.

It is evident from FIG. 1 that the longitudinal extent (i.e. in the longitudinal direction 71) of the coupling portion 171 is quite small in comparison with the longitudinal extent of the waveguide portion 172. In general, this longitudinal extent of the waveguide portion 172 could be at least five times as long as the longitudinal extent of the coupling portion 171. This makes it possible to reconstruct a particularly large hologram 280.

For example, the longitudinal extent of the waveguide portion 172 can correspond to a total of at least five reflections 50 of light between the top side 271 and the underside 272.

In this case, the holographic optical element 279 need not extend over the entire length of the waveguide portion 172 in the longitudinal direction 71 (although this would be possible). For example, the longitudinal extent of the holographic optical element 279 could be in a range of 20% to 80% of the longitudinal extent of the waveguide portion 172.

Moreover, aspects in the context of an adjustment of the decoupling efficiency 270 of the holographic optical element 279 are depicted in FIG. 1 as a function of the longitudinal position. The decoupling efficiency 270 adopts different values 721, 722, 723 as a function of the position in the longitudinal direction 71 (illustrated by the arrows in FIG. 1). In particular, the decoupling efficiency 270 adopts larger values 721-723, the further the corresponding position is away from the coupling portion 171. This decoupling efficiency describes a fraction of the amount of light incident locally on the holographic optical element in each case that is decoupled from the waveguide portion 172 by the holographic optical element for the purpose of reconstructing the hologram 280. Thus, the values of the decoupling efficiency can vary in the range from 0 to 1.

For example, the values 721-723 could increase incrementally, wherein each step has in the longitudinal direction 71 an extent that correlates with the projection of the beam cross section 390 on the surface 271 ("footprint" of the beam path 199). This means that the value is increased discontinuously in each case from footprint to footprint.

A continuous/gradual increase would also be conceivable.

Such a dependence of the decoupling efficiency 270 as a function of the positions in the longitudinal direction 71 has the following background: for example, a certain component of the light 190 is used in the case of the first reflections 50 (position X1) for the reconstruction of the hologram 280 in the corresponding region on account of the local value 271 of the decoupling efficiency 270. This reduces the amount of light in the waveguide portion 172. If the holographic optical element 279 were configured in such a way at the position X2 (arranged downstream along the beam path 199) that it decouples the light 190 from the waveguide portion 172 with the same value 721 of the decoupling efficiency 270 for the purpose of reconstructing the hologram 280, then this would lead—on account of the already reduced amount of light, due to decoupling at the position X1—to a reduced brightness of the hologram 280 in the corresponding region—the amount of light decoupled and used for the reconstruction of the hologram 280 would be reduced. The hologram 280 would then appear darker locally, or a drop in brightness would be observed. This effect can be counteracted by using the larger value 722 at the position X2 and the even larger value 723 at the position X3 (respectively indicated by the arrows in FIG. 1). What this achieves is that the amount of decoupled light 729 (cf. the inset in FIG. 1) used to reconstruct the hologram 280 is virtually constant as a function of the positions in the longitudinal direction 71. The inset of FIG. 1 also indicates the footprint of the beam path 199, i.e. the length of the projection of the beam cross section 390 on the top side 271.

In principle, such a compensation of the reduction in light 190 available as a function of the positions in the longitudinal direction 71 as a result of a suitable adjustment of the values of the decoupling efficiency can be overlaid by an adjustment of the values of the decoupling efficiency on account of a variable image brightness of the hologram 280. This means that this dependence of the decoupling efficiency 270 can also be influenced by different desired image brightnesses (in order to produce contrast in an image motif).

Figure 2:
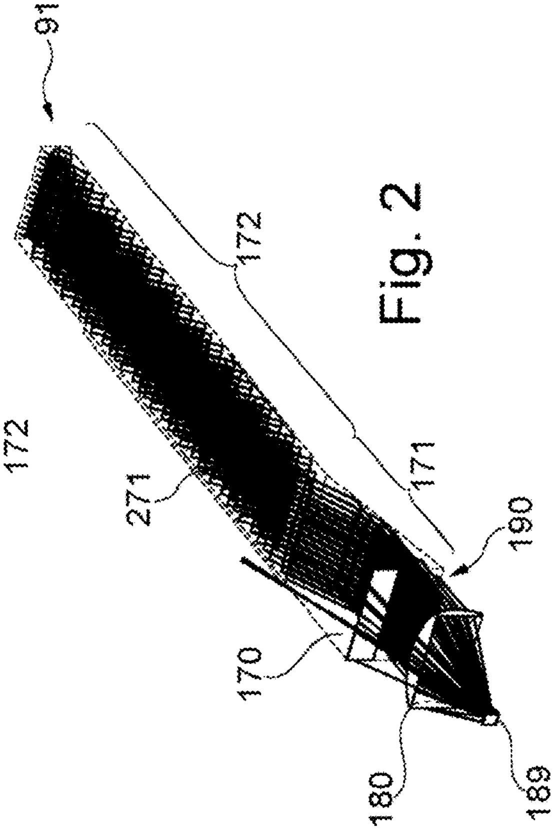
FIG. 2 is a perspective view of the lighting device from FIG. 1.

FIG. 2 is a perspective view of the lighting device 91 from FIG. 1.

In principle, variations of the lighting device 91 from FIG. 1 and FIG. 2 are conceivable. Some possible variations are explained in conjunction with the following figures.

Figure 3:
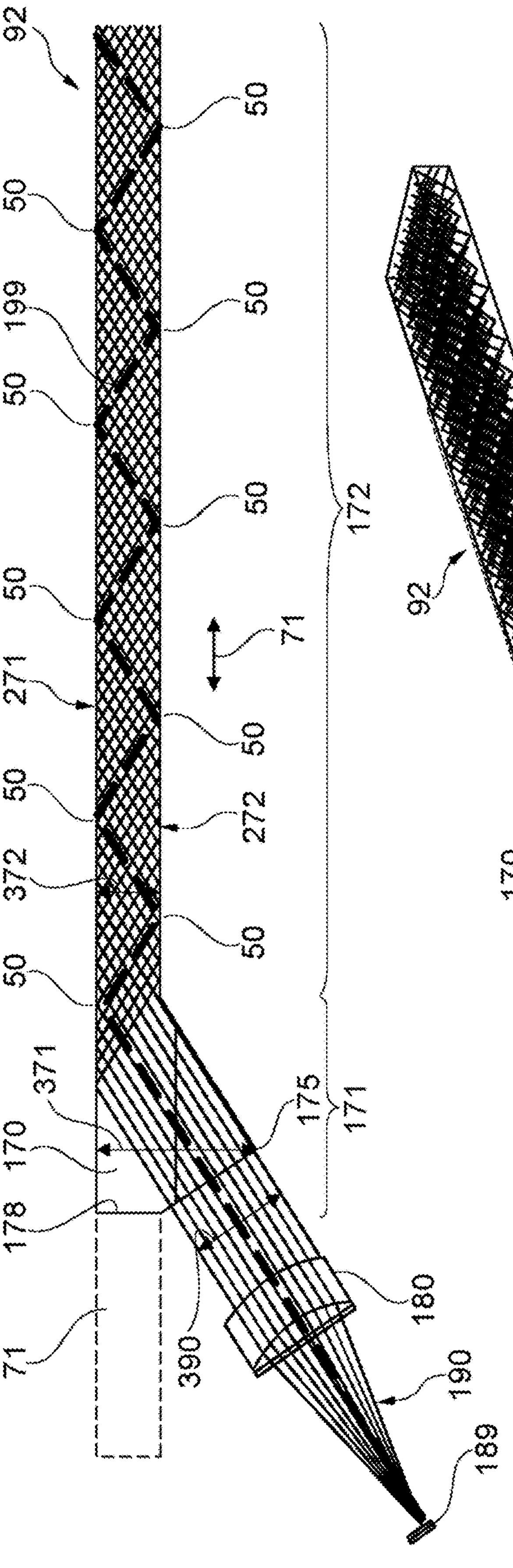
FIG. 3 is a schematic side view of a lighting device according to various examples.

For example, FIG. 3 is a schematic side view of a lighting device 92 which in principle corresponds to the lighting device 91 from the example of FIG. 1 and FIG. 2, wherein however in the example of FIG. 3 the coupling portion 171 and the coupling face 175 are arranged such that it is possible to manage without a reflection face 176 in the example of FIG. 1 and FIG. 2. This means that the light 190 or beam path 199 can enter the waveguide portion 172 directly without a deflection in the optical block 170.

For illustrative purposes, FIG. 3 also shows the arrangement of a fastening element 71 (a corresponding fastening element 71 could also be used in the other exemplary implementations of the lighting devices discussed herein).

The fastening element 71—for instance a clamp or a metal bracket or a plastic part—is configured to secure the optical block 170 in surroundings, for instance to a cheek of a flap—for instance a vehicle door or a tailgate or luggage compartment lid—of a motor vehicle. For example, a corresponding lighting device could be integrated in a perpendicular body pillar, for instance the B pillar. For example, the lighting device could be integrated in a skirt of an interior door of the motor vehicle.

It is evident from FIG. 3 that the fastening element 71 secures the optical block 170 at an engagement face 178 of the optical block 170. The engagement face 178 is arranged adjacent to the coupling face 175, offset to the top side 271. The greater thickness 371 allows such fastening to be particularly stable. In this case, the optical element 180 is arranged below the fastening element 71. This saves installation space.

The fastening element 71 extends away flush from the top side 271 of the optical block 170. For example, this can enable a seamless integration into a surrounding structure. The fastening element 71 can also be embodied as a monolithic component part together with the optical block 170.

This engagement face 178 is arranged as a continuation in the longitudinal direction 71 of the waveguide portion 172. This enables a small thickness (perpendicular to the longitudinal extent 71) of the lighting device.

Figure 4:
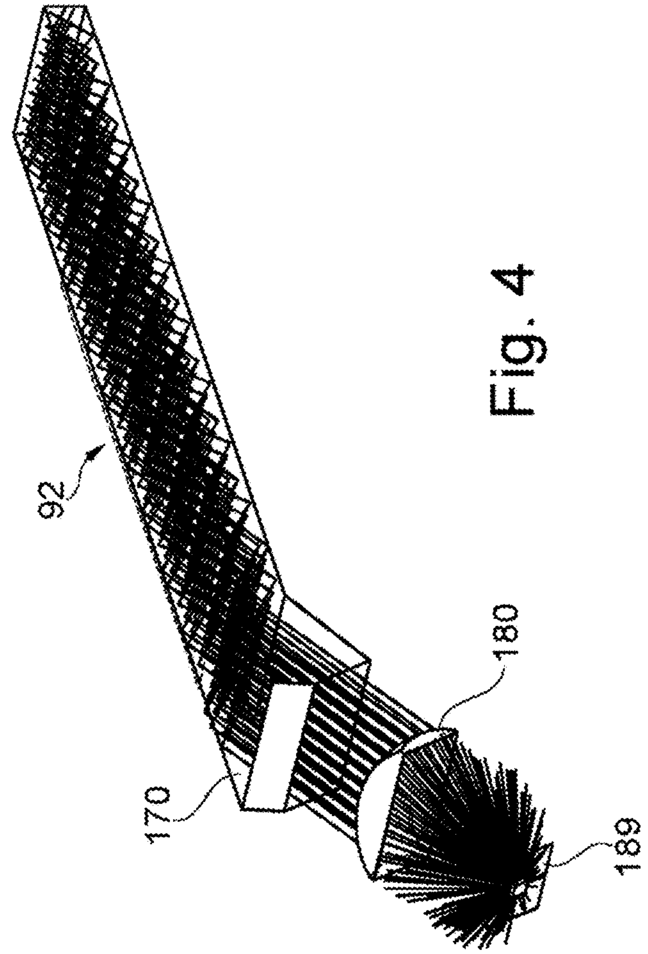
FIG. 4 is a perspective view of the lighting device from FIG. 3.

FIG. 4 is a perspective view of the optical device 92 from FIG. 3.

Figure 5:
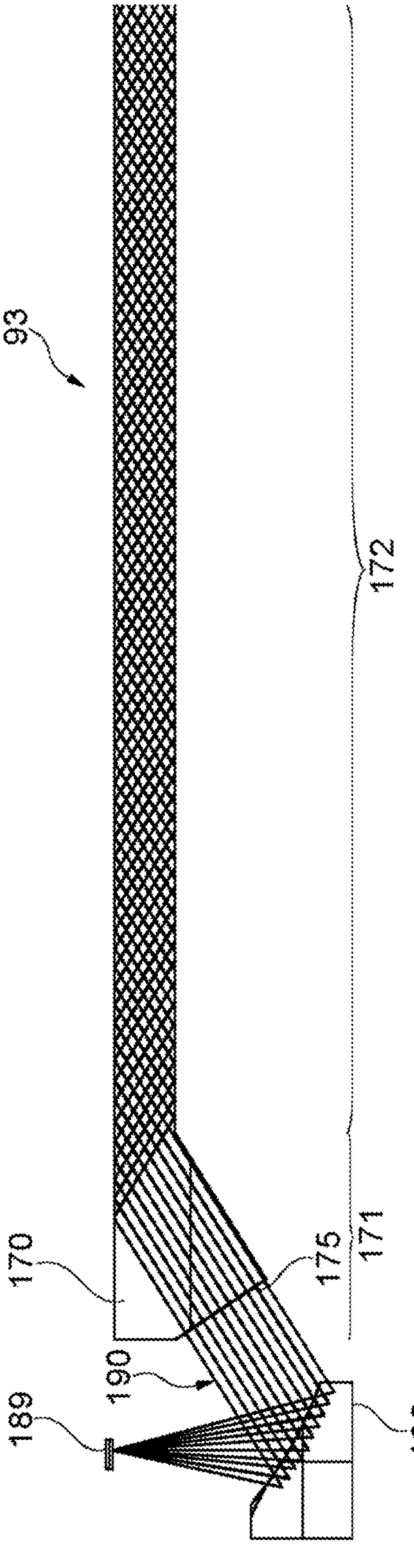
FIG. 5 is a schematic side view of a lighting device according to various examples.

FIG. 5 shows a further variation of the lighting device. FIG. 5 is a schematic side view of the lighting device 93. It corresponds to the principle of the lighting device 92 from FIG. 3 and FIG. 4, wherein however the light source 189 is arranged in such a way that the beam path 199 is deflected to the coupling face 175 by the optical element 180—implemented as a converging mirror in this case.

Figure 6:
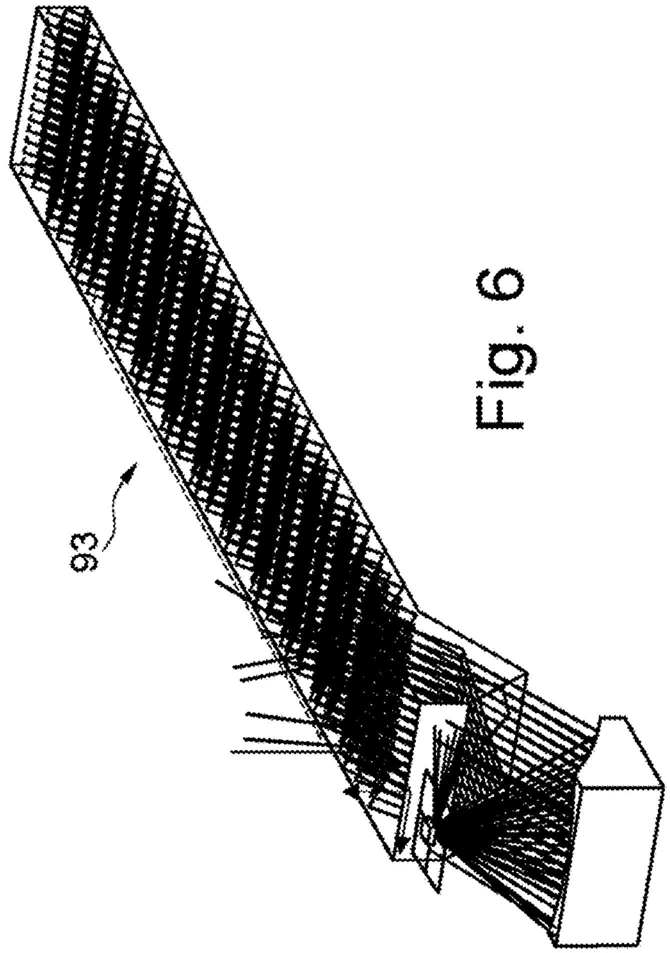
FIG. 6 is a perspective view of the lighting device from FIG. 5.

FIG. 6 is a perspective view of the optical device 93 from FIG. 5.

Figure 7:
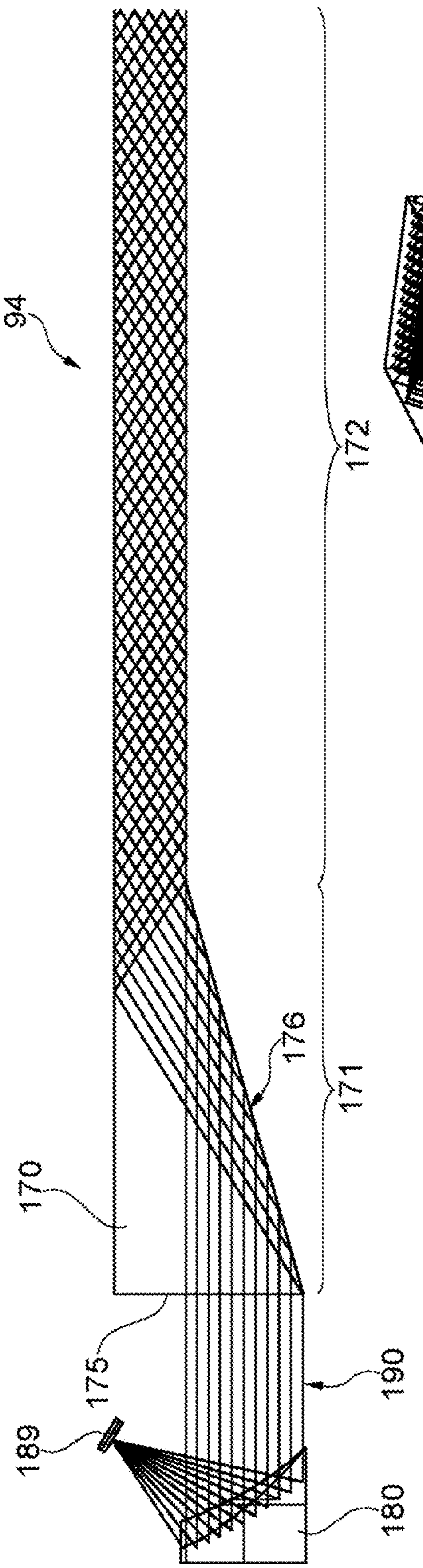
FIG. 7 is a schematic side view of a lighting device according to various examples.

FIG. 7 shows a further variation of the lighting device. FIG. 7 is a schematic side view of the lighting device 94. It corresponds to the principle of the lighting device 91 from FIG. 1 and FIG. 2, wherein however the light source 189 is arranged in such a way that the beam path 199 is deflected to the coupling face 175 by the optical element 180—implemented as a converging mirror in this case.

By way of example, in the example of FIG. 7 and in the example of FIG. 5, it would be conceivable that the light source 189 is arranged in each case in the fastening element 71 (not shown in FIG. 5 and FIG. 7, but could be arranged e.g. in accordance with FIG. 3). To this end, the fastening element can have a corresponding cutout. This enables a particularly compact design.

Figure 8:
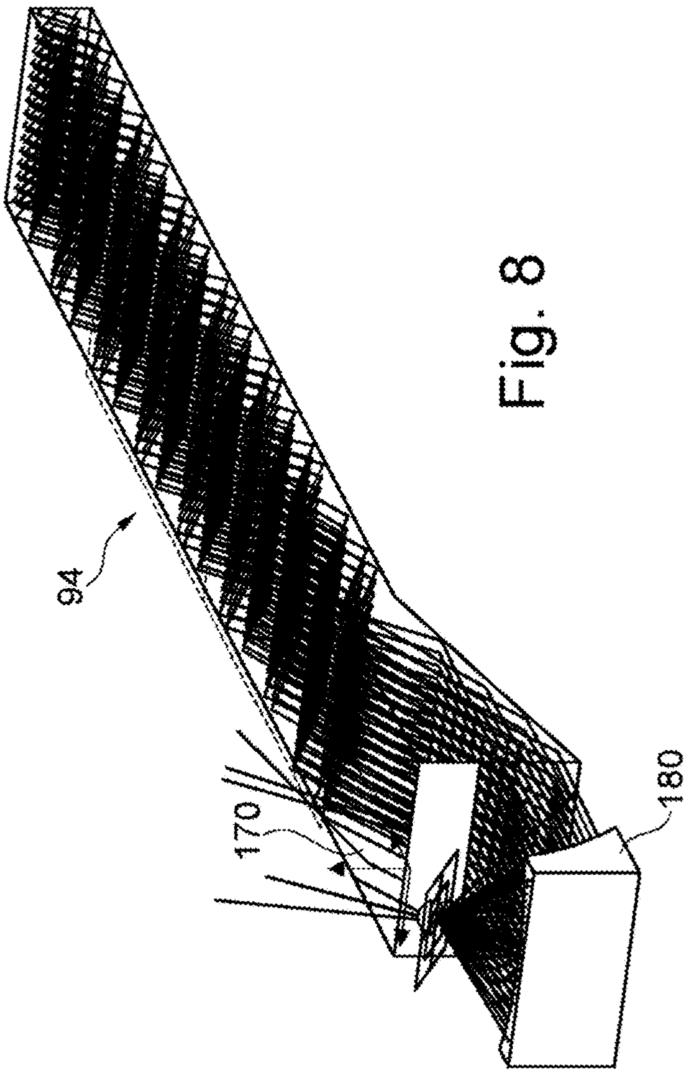
FIG. 8 is a perspective view of the lighting device from FIG. 7.

FIG. 8 is a perspective view of the optical device 94 from FIG. 7.

Variants were shown above in the context of the lighting devices 91-94, in which the thickness 371 of the optical block 170 in the region of the coupling portion 171 is greater than the thickness 372 of the optical block 170 in the region of the waveguide portion 172.

It is not mandatory for the thickness 372 of the optical block in the region of the waveguide portion to be smaller than the thickness 371. A particularly compact structure can be achieved if the thickness 371 is smaller than the thickness 372. On the other hand, it is hardly possible to obtain a large beam cross section 390 such that the light is reflected particularly frequently in the waveguide portion 172, which can overall reduce the quality of the reconstruction of the hologram 280. Moreover, it is difficult to couple the light into the optical block 170 with a high efficiency. Further, it is difficult to attain a high degree of collimation for the light 190.

Figure 9:
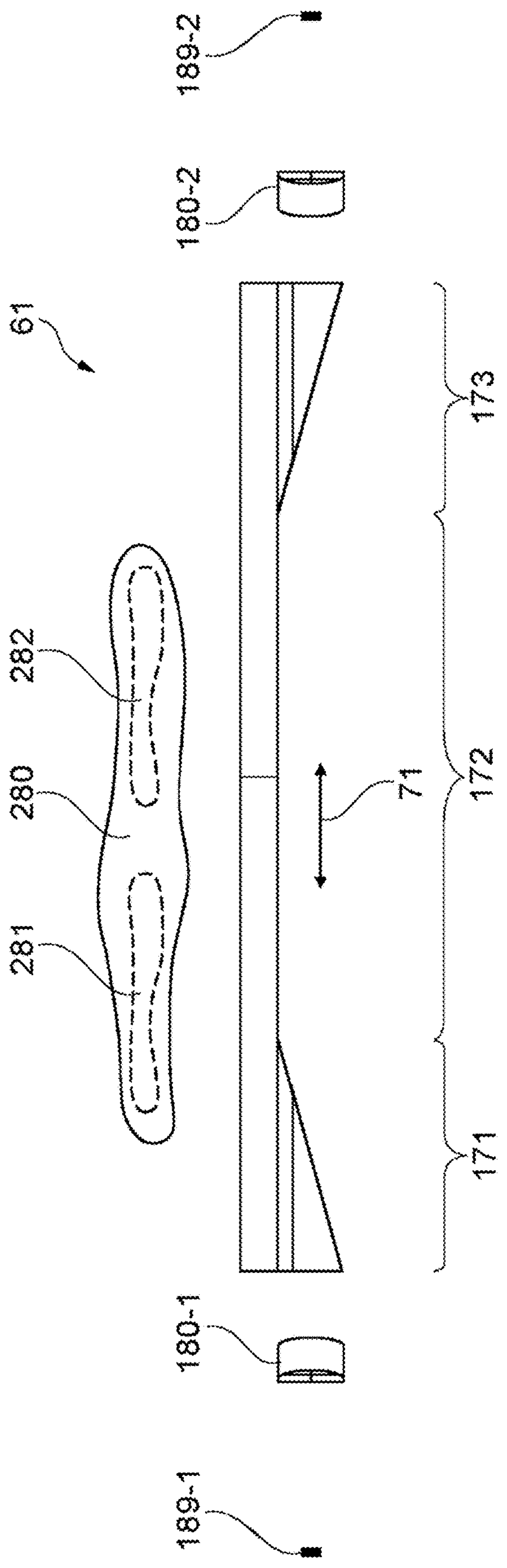
FIG. 9 schematically illustrates a lighting device according to various examples.
Figure 10:
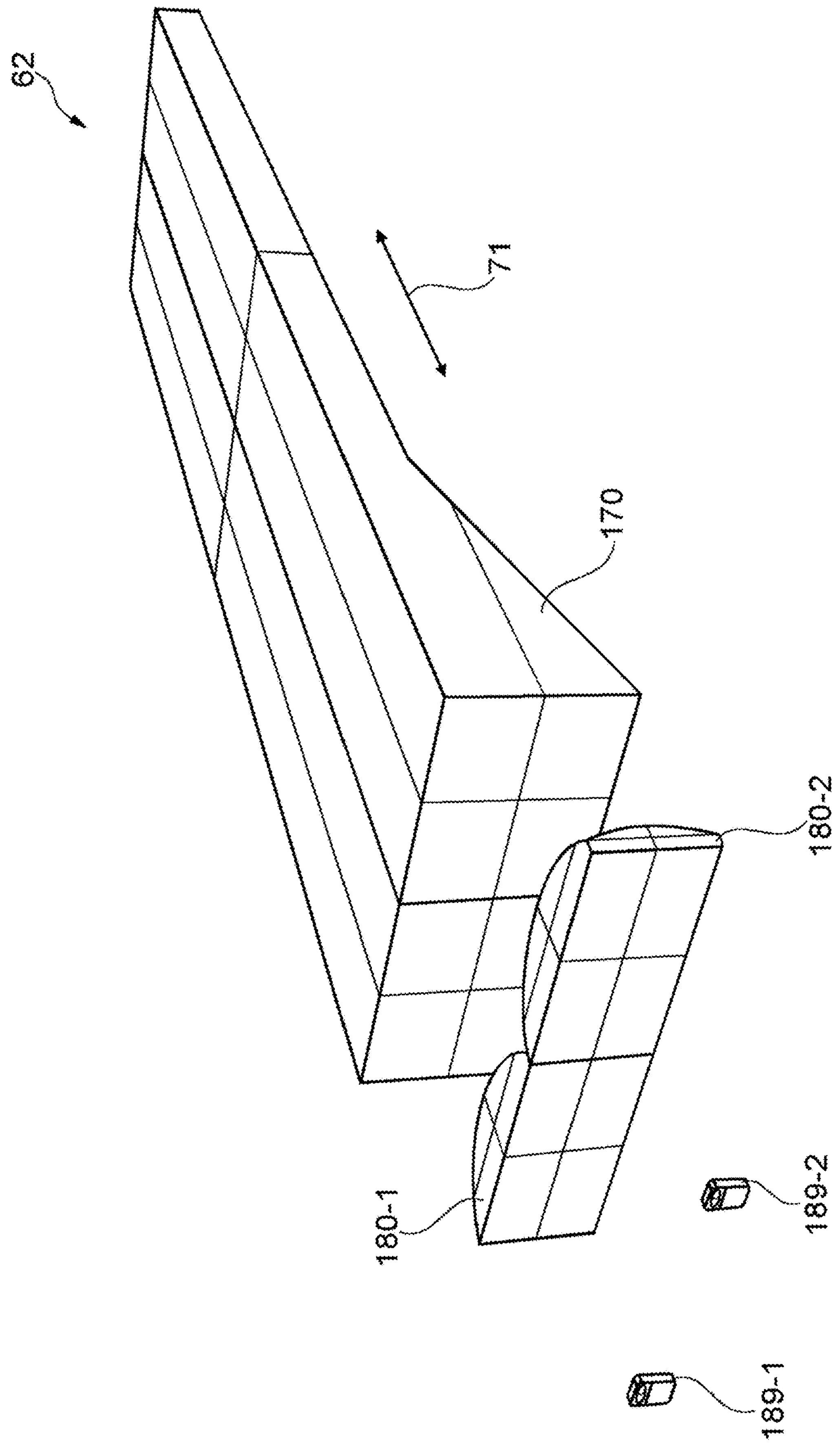
FIG. 10 schematically illustrates a lighting device according to various examples.

FIG. 9 shows an exemplary view of a lighting device 61 which comprises two coupling portions 171, 173 on opposite sides of a waveguide portion 172 (and moreover correspondingly comprises two light sources 189-1, 189-2 and two optical elements 180-1, 180-2). For example, a particularly large-area hologram 280 could thus be reconstructed by joint operation of the light sources 189-1, 189-2. It would also be conceivable to reconstruct two separate holograms 281, 282, depending on which of the light sources 189-1, 189-2 are switched on or off. Such a combination of a plurality of light sources 189-1, 189-2 in a corresponding lighting device 62 is also shown in the example of FIG. 10, albeit perpendicular to the longitudinal direction 71 in this case. In the example of FIGS. 9 and 10, the lighting devices 61, 62 could be implemented according to any of the lighting devices 91-94.

In summary, techniques were described above for the purpose of creating a hologram by means of lighting devices that can be integrated particularly compactly. In particular, such lighting devices can be integrated in an elongate installation space, for instance in a side cheek of a motor vehicle flap or in a skirt of an interior door of a motor vehicle, as a result of using a waveguide. For example, signals can be output to a user by means of such techniques. For example, the hologram could be activated if the fill level of an energy store of a drive of the motor vehicle drops below a specific threshold value. For example, the hologram could be activated if a passenger is identified in the interior of the vehicle (such that no child is forgotten in the interior). However, the above-described application in the motor vehicle is only exemplary. Corresponding techniques can also be used for other applications with elongate but shallow installation spaces. Examples relate for example to luminous strips on the floor, for instance in aircraft, or for guiding the flow of people. Billboards could be implemented accordingly.

It goes without saying that the features of the embodiments and aspects of the invention described above may be combined with one another. In particular, the features may be used not only in the combinations described but also in other combinations or on their own, without departing from the scope of the invention.

What is claimed is:

1. A lighting device, wherein:
- a light source configured to transmit light along a beam path,
- an optical element arranged along the beam path and configured to reduce a divergence of the light, and
- an optical block arranged downstream of the optical element in the beam path and comprising:
  - a coupling portion with a coupling face arranged to couple light into the optical block, and
  - a waveguide portion extending away from the coupling portion and configured to guide the light by multiple reflections between a top side and an underside of the waveguide portion,
  - a holographic optical element formed in the waveguide portion, wherein a hologram is recorded in the holographic optical element, and wherein the holographic optical element is configured to decouple light from the waveguide portion and reconstruct the hologram upon illumination by the light.

2. The lighting device as claimed in claim 1, wherein the thickness of the optical block is greater in a region of the coupling portion than in a region of the waveguide portion.

3. The lighting device as claimed in claim 1, wherein the coupling portion comprises a reflection face arranged opposite the coupling face and configured to deflect the beam path of the light toward the waveguide portion in the optical block.

4. The lighting device as claimed in claim 3, wherein the reflection face is arranged in relation to the beam path of the light in such a way that the light is deflected by total-internal reflection.

5. The lighting device as claimed in claim 1, wherein the light source is arranged offset in relation to the optical block in a longitudinal direction of the waveguide portion.

6. The lighting device as claimed in claim 1, wherein the light source is arranged such that the light reaches the optical block without deflection of the beam path.

7. The lighting device as claimed in claim 1, wherein a beam cross section of the beam path at the coupling face is in a range of 100% to 500% of a thickness of the optical block in the region of the waveguide portion.

8. The lighting device as claimed in claim 1, wherein a longitudinal extent of the waveguide portion is at least five times as long as a longitudinal extent of the coupling portion.

9. The lighting device as claimed in claim 1, wherein a longitudinal extent of the waveguide portion corresponds to a total of at least five reflections of the light between the top side and underside of the waveguide portion.

10. The lighting device as claimed in claim 1, wherein a longitudinal extent of the holographic optical element is in the range of 20% to 80% of a longitudinal extent of the waveguide portion.

11. The lighting device as claimed in claim 1, further comprising:
- a fastening element configured to secure the optical block to a cheek of a flap of a motor vehicle.

12. The lighting device as claimed in claim 11, wherein the fastening element secures the optical block at an engagement face of the coupling portion.

13. The lighting device as claimed in claim 12, wherein the optical element is arranged below the fastening element.

14. The lighting device as claimed in claim 12, wherein the fastening element comprises a cutout in which the light source is arranged.

15. The lighting device as claimed in claim 11, wherein the fastening element extends flush away from the top side of the optical block.

16. The lighting device as claimed in claim 1,
wherein the optical element is configured to deflect the beam path coming from the light source toward the coupling face.

17. The lighting device as claimed in claim 1,
wherein the optical element is embodied as a concavely arched mirror or as a converging lens.

18. The lighting device as claimed in claim 1,
wherein the coupling face is oriented at right angles to a central ray of the beam path of the light.

19. The lighting device as claimed in claim 1,
wherein the holographic optical element is formed on the top side and/or the underside of the waveguide portion.

20. The lighting device as claimed in claim 1,
wherein the holographic optical element is configured such that a decoupling efficiency of the light adopts greater values for positions arranged further away from the coupling portion.

21. The lighting device as claimed in claim 1,
wherein the holographic optical element is configured such that a dependence of a decoupling efficiency on a position along the waveguide portion compensates for a reduction in the amount of light due to the light being decoupled from the waveguide portion upstream.

22. A motor vehicle, comprising:
a flap; and
the lighting device as claimed in claim 1 disposed on a cheek of the flap.

23. The motor vehicle as claimed in claim 22,
wherein the lighting device is integrated in a perpendicular body pillar.

24. The motor vehicle as claimed in claim 22,
wherein the lighting device is integrated in a skirt of an interior door.

25. The lighting device as claimed in claim 1, wherein the holographic optical element formed is configured to reconstruct at least one of a pictorial motif or a three-dimensional hologram in a viewing region above a surface of the waveguide.

* * * * *